Nov. 27, 1923.  1,475,386
W. F. HENKE ET AL
SPRING CONNECTING ROD FOR SWITCH THROWS
Filed July 5, 1923    2 Sheets-Sheet 1
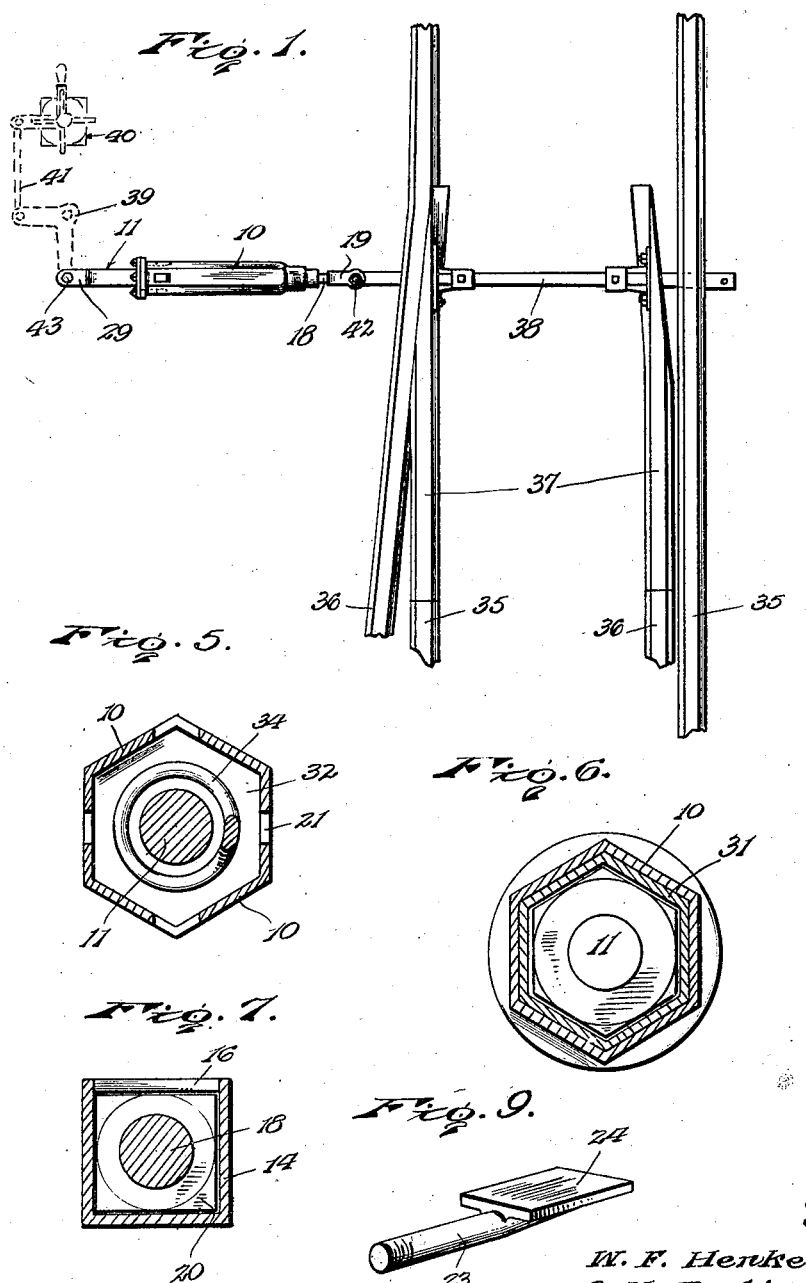
Inventors
W. F. Henke.
C. H. Partington.
By
Lacey & Lacey, Attorneys Nov. 27, 1923.                                                        1,475,386
                         W. F. HENKE ET AL
                 SPRING CONNECTING ROD FOR SWITCH THROWS
                     Filed July 5, 1923    2 Sheets-Sheet 2
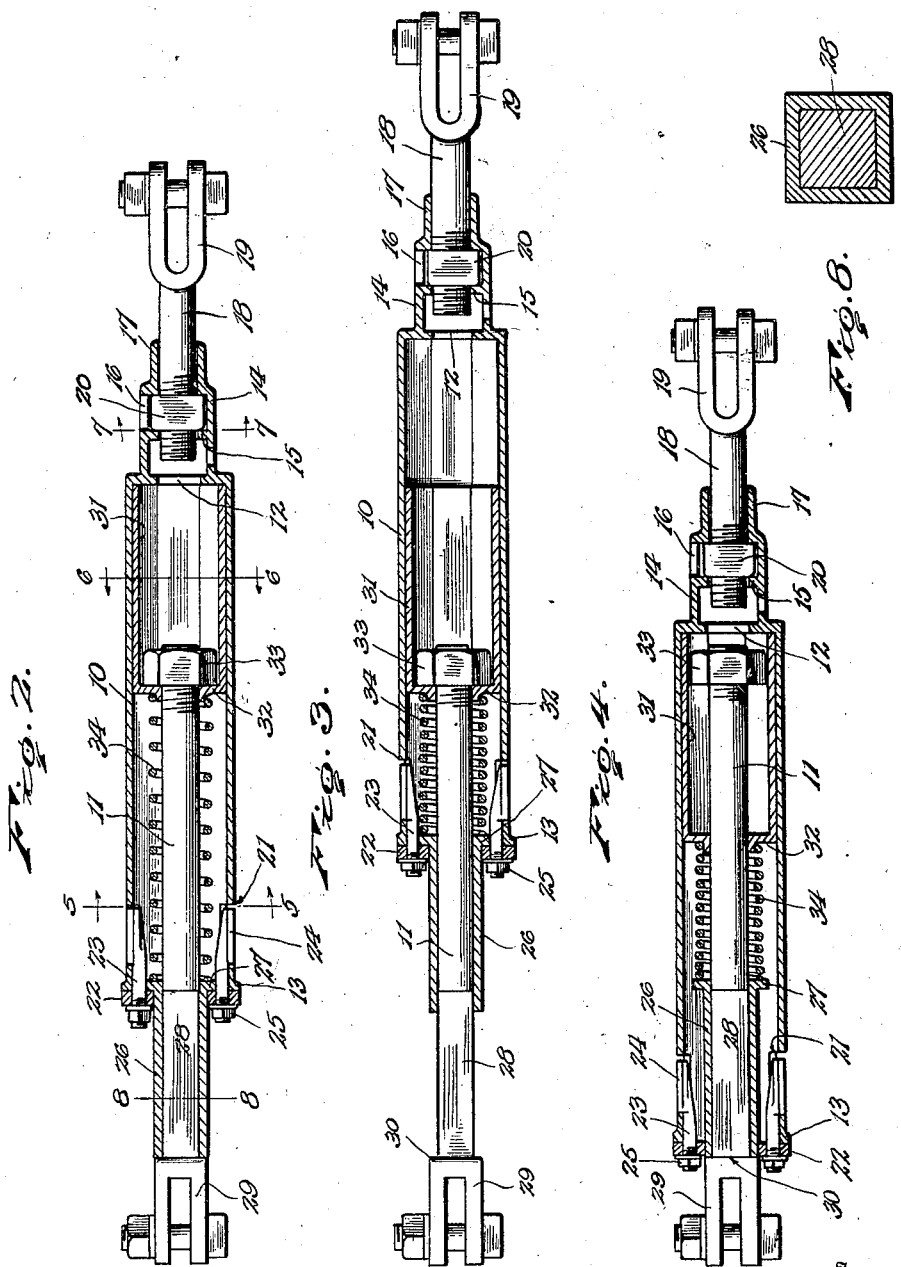
Inventors
W. F. Henke.
C. H. Partington.
By
Lacey Lacey, Attorneys Patented Nov. 27, 1923.

1,475,386

UNITED STATES PATENT OFFICE.

WILLIAM F. HENKE, OF NORWOOD, AND CHARLES H. PARTINGTON, OF CINCINNATI, OHIO, ASSIGNORS TO THE CINCINNATI FROG AND SWITCH COMPANY, OF CINCINNATI, OHIO, A CORPORATION OF OHIO.

SPRING CONNECTING ROD FOR SWITCH THROWS.

Application filed July 5, 1923. Serial No. 649,678.

*To all whom it may concern:*

Be it known that we, WILLIAM F. HENKE and CHARLES H. PARTINGTON, citizens of the United States, residing at Norwood and Cincinnati, respectively, in the county of Hamilton and State of Ohio, have invented certain new and useful Improvements in Spring Connecting Rods for Switch Throws, of which the following is a specification.

This invention relates to an improved spring connecting rod for switch throws and seeks, among other objects, to provide a device of this character wherein thrust upon the device will be transmitted therethrough in a straight line from end to end of the device so that the device will thus readily respond to the movement of the switch points when shifted by the wheels of rolling stock while wear and useless resistance will be reduced to a minimum.

The invention seeks, as a further object, to provide a device which may be adjusted lineally so that the device may be readily installed in practical use.

And the invention seeks, as a still further object, to provide a device which, when adjusted, will be locked in adjusted position.

Other and incidental objects will appear hereinafter.

In the drawings:

Figure 1 is a plan view showing our improved connecting rod in conjunction with a convention switch throw and switch, Figure 2 is a horizontal sectional view through the device, Figure 3 is a view similar to Figure 2, showing the device extended, Figure 4 is a view similar to Figure 3, showing the device collapsed, Figure 5 is a transverse sectional view on the line 5—5 of Figure 2, looking in the direction of the arrows, Figure 6 is a transverse sectional view on the line 6—6 of Figure 2, looking in the direction of the arrows, Figure 7 is a transverse sectional view on the line 7—7 of Figure 2, looking in the direction of the arrows, Figure 8 is a transverse sectional view on the line 8—8 of Figure 2, and Figure 9 is a detail perspective view of one of the securing bolts employed.

In carrying the invention into effect, we employ telescopic rod sections 10 and 11 respectively, the section 10 forming a barrel to receive the section 11. As brought out in Figure 6, the barrel 10 is preferably hexagonal in cross section and is provided at its forward end with an end wall having an axial opening 12 therein while at the rear end of the barrel is formed an annular flange 13. Formed on the forward end wall of the barrel to surround the opening 12 is a squared boss 14 having a partition wall 15 therein and provided at one side with an opening 16 while upon the forward end of the boss is formed an annular sleeve 17. Extending through said sleeve and freely through the partition wall 15 of the boss is a rod 18 provided at its forward end with a yoke 19 and confined within the boss is, as shown in detail in Figures 4 and 7, a nut 20 threaded on the rod, the nut being insertable through the opening 16. Thus, as will be seen, the nut will be locked against rotation so that the rod 18 may be turned through the nut for varying the effective length of the device, the opening 12 in the forward end wall of the barrel being adapted to freely receive the rod therethrough.

Formed in the barrel near the rear end thereof are, as shown in detail in Figure 5, spaced openings 21 and closing the barrel at its rear end is a cap plate 22 resting upon the flange 13. Extending at the inner side of the barrel through said plate are bolts 23 provided at their inner ends, as shown in detail in Figure 9, with oblong heads 24 engaging in the openings 21 while upon the outer ends of the bolts are threaded nuts 25 which, as will be seen, may be adjusted for tightly clamping the cap plate in position. Slidably fitting through the cap plate is a squared sleeve 26 surrounding the rod section 11, the plate 22 being provided with a squared opening to receive the sleeve, and formed on said sleeve at its inner end is an annular flange 27. As shown in detail in Figure 8, the rod section 11 is formed with a squared outer end portion 28 to fit within the sleeve and formed on or otherwise secured to the rod at its outer end is a yoke 29 providing a shoulder 30 to abut the outer end of the sleeve.

Slidable in the barrel 10 is a hollow sleeve or plunger 31 which, as shown in detail in Figure 6, is hexagonal in cross section to fit the sleeve and is provided at its outer end with an end wall 32 while at its inner end the plunger is open. The end wall 32 of the plunger is formed to freely receive the rod section 11 therethrough and threaded upon the inner end of said rod section is a hexagonal nut 33 locked against rotation by the plunger. Bearing between the outer end of the plunger and the flange 27 of the sleeve 26 is a spring 34 constantly under tension and, as shown in Figure 2, normally holding the plunger against the forward end wall of the barrel 10 as well as holding the flange 27 of the sleeve against the cap plate 22.

In Figure 1 of the drawings, we have shown our improved connecting rod in conjunction with a conventional switch and switch throw, the switch throw and associated bell crank being illustrated in dotted lines. Main track rails are indicated at 35 and side track rails at 36, while at 37 are indicated companion switch points connected by the usual switch bar 38. The bell crank mentioned is indicated at 39 and the switch throw at 40, and connecting the switch throw with one arm of the bell crank is a rod 41. As will be seen, the yoke 19 of the rod 18 of the present device is connected to the switch bar 38 by a bolt 42 while the yoke 29 of the rod section 11 is connected to the adjacent arm of the bell crank 39 by a similar bolt 43. Thus, the device will form an operative connection between the bell crank and the switch bar.

As will now be seen, the switch throw 40 may be swung in one direction for closing the switch, as shown in Figure 1, or may be swung in the opposite direction for opening the switch, when the switch points 37 will occupy a position reverse to that illustrated. When the switch throw is thus swung in either one direction or the other, the connecting rod will, of course, bodily move longitudinally as a unit so that the switch may be set as desired, the spring 34 being of ample rigidity to resist the force necessary to move the switch points under the impulse of the switch throw. However, assuming the switch to be closed, it will be seen that the switch points 37 may move to the right, as seen in Figure 1, when, as shown in detail in Figure 3, the sleeve 26 will slide along the rod section 11 while the plunger 31 will slide within the barrel 10, compressing the spring 34. Consequently, upon the release of the switch points by the wheels of rolling stock, said spring will return the parts to normal, as seen in Figure 2, and consequently function to return the switch points to their original set position. On the other hand, assuming the switch to be open, it will be seen that the switch points may be moved to the left when,
as shown in detail in Figure 4, the cap plate 22 will be caused to slide along the sleeve 26 with the result that the plunger 31 will be moved rearwardly along the rod section 11 while the spring 34 will, since the sleeve 26 will be limited by the shoulder 30 of the yoke 29, be compressed between said sleeve and the plunger. Consequently, upon the release of the switch points by the wheels of rolling stock, the spring will function to return the parts to normal, as seen in Figure 2, and thus return the switch to its original set position. We accordingly provide a device wherein the switch may be set in either open or closed position and which will function to return the switch, when the switch points are shifted independently of the switch throw, to the position set. Furthermore, as will be noted, the thrust upon the device will in all instances be transmitted in a straight line longitudinally through the device. Further, it is to be observed that after the device has been adjusted and installed, the switch bar 38 will lock the rod 18 against rotation while the bell crank 39 will lock the rod section 11 against rotation. Similarly, the nut 33 will lock the plunger 30 against rotation which, in turn, will lock the barrel 10 against rotation, so that the several parts of the device will be effectually maintained in adjusted position.

Having thus described the invention, what is claimed as new is:

1. A switch throw rod including coacting relatively movable rod sections, means at the outer end portion of one of said sections for mounting the rod at one end, lineally adjustable means at the outer end portion of the other of said sections for mounting the rod at its opposite end, and yieldable means coacting between the inner end portions of said sections to be compressed thereby for resisting movement of the sections elongating the rod as well as movement of the sections shortening the rod.

2. A switch throw rod including coacting relatively movable rod sections, means at the outer end portions of said sections for mounting the rod, one of the sections forming a barrel receiving the other of said sections, a plunger slidable upon the latter section within the barrel, and yieldable means operatively coacting between said plunger and the barrel to be compressed thereby for resisting movement of the sections elongating the rod as well as movement of the sections shortening the rod.

3. A switch throw rod including coacting relatively movable rod sections, means at the outer end portions of said sections for mounting the rod, one of the sections forming a barrel receiving the other of said sections, a sleeve slidably fitting the latter section to coact between such section and the barrel, and a spring operatively bearing between the former section and said sleeve to be compressed thereby for resisting movement of the sections elongating the rod as well as movement of the sections shortening the rod.

4. A switch throw rod including coacting relatively movable rod sections, means at the outer end portions of said sections for mounting the rod, one of the sections forming a barrel receiving the other of said sections, a plunger slidable upon the latter section within the barrel, a sleeve slidable upon the latter section to coact between such section and the barrel, and a spring bearing between said sleeve and plunger to be compressed thereby for resisting movement of the sections elongating the rod as well as movement of the sections shortening the rod.

5. A switch throw rod including coacting relatively movable rod sections, means at the outer end portions of said sections for mounting the rod, one of said sections forming a barrel receiving the other of said sections, and said barrel being provided with openings, a cap plate closing the barrel, bolts having heads engaged in said openings and coacting with the cap plate securing the plate in position, a sleeve slidable upon the latter rod section and limited against movement in one direction by said plate, a plunger slidable upon the latter section within the barrel and limited against movement in the opposite direction upon the latter section, and a spring bearing between said plunger and sleeve to be compressed thereby for resisting movement of the sections elongating the rod as well as movement of the sections shortening the rod.

6. A switch throw rod including coacting relatively movable rod sections, means carried by one of the sections limiting said sections against separation, means coacting between said limiting means and another of said sections locking said limiting means against displacement, and yieldable means resisting relative movement of the sections.

7. A switch throw rod including coacting relatively movable rod sections, means rotatably engaged with one of the sections limiting the sections against separation, means coacting between said limiting means and another of said sections locking said limiting means against retrograde movement, means coacting between the sections locking the sections against relative rotation, and yieldable means resisting relative lineal movement of the sections.

8. A switch throw rod including coacting relatively movable rod sections, means carried by one of said sections limiting the sections against separation, a plunger slidably fitting in another of said sections to coact between the latter section and said limiting means locking the limiting means against rotation, and yieldable means coacting between said plunger and said first mentioned section resisting relative movement of the sections.

9. A switch throw rod including coacting relatively movable rod sections, means carried by one of said sections limiting the sections against separation, a plunger slidably fitting in another of said sections to coact with said limiting means locking the limiting means against displacement, a sleeve slidably fitting the former rod section to coact with the latter rod section locking the sections against relative rotation, and a spring coacting between the plunger and sleeve for resisting relative lineal movement of the sections.

10. A switch throw rod including coacting relatively movable rod sections, means carried by one of said sections limiting the sections against separation, a hollow plunger connected with said section by said limiting means and surrounding said limitng means to coact between such means and another of said sections locking the limiting means against displacement, and yieldable means acting against said plunger for resisting relative movement of the sections.

In testimony whereof we affix our signatures.

WILLIAM F. HENKE. [L. S.]
CHARLES H. PARTINGTON. [L. S.]